United States Patent
Kim et al.

(10) Patent No.: US 10,172,085 B2
(45) Date of Patent: Jan. 1, 2019

(54) METHOD FOR SUPPORTING POWER SAVING MODE AND WIRELESS DEVICE THEREOF

(71) Applicant: LG ELECTRONICS INC., Seoul (KR)

(72) Inventors: Jaehyun Kim, Seoul (KR); Jinsook Ryu, Seoul (KR); Taehun Kim, Seoul (KR); Hyunsook Kim, Seoul (KR); Laeyoung Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/110,617

(22) PCT Filed: Jan. 16, 2015

(86) PCT No.: PCT/KR2015/000465
§ 371 (c)(1),
(2) Date: Jul. 8, 2016

(87) PCT Pub. No.: WO2015/108363
PCT Pub. Date: Jul. 23, 2015

(65) Prior Publication Data
US 2016/0381639 A1    Dec. 29, 2016

Related U.S. Application Data

(60) Provisional application No. 61/929,103, filed on Jan. 19, 2014.

(51) Int. Cl.
*H04W 52/02* (2009.01)
*H04W 60/00* (2009.01)
(Continued)

(52) U.S. Cl.
CPC ....... *H04W 52/0235* (2013.01); *H04W 60/00* (2013.01); *H04W 76/18* (2018.02);
(Continued)

(58) Field of Classification Search
None
See application file for complete search history.

(56) References Cited

U.S. PATENT DOCUMENTS 9,030,981 B2 *  5/2015  Gong .................. H04M 1/7253
                                                    370/311
9,148,902 B2 *  9/2015  Grandhi ............. H04W 76/043
(Continued)

FOREIGN PATENT DOCUMENTS

CN          103379593 A    10/2013
EP          2475213 A2      7/2012
(Continued)

OTHER PUBLICATIONS

Interdigital, "Further Clarifications for PSM and Interactions with Existing Functionalities," SA WG2 Temporary Document, S2-140230 (revision of S2-14xxxx), SA WG2 Meeting #101, Taipei, Taiwan, Jan. 20-24, 2014 (Jan. 14, 2014), pp. 1-4 (5 pages total).
(Continued)

*Primary Examiner* — Anh Ngoc M Nguyen
(74) *Attorney, Agent, or Firm* — Birch, Stewart, Kolasch & Birch, LLP

(57) ABSTRACT

One embodiment of the present specification provides a method for supporting a power saving mode in a wireless device. The method can comprise the steps of: transmitting a request message including a first active time value to a network entity, if a PSM is necessary; and receiving a rejection message for the request message from the network entity. Here, the rejection message includes the reason for rejection, and can include a second active time value deter-
(Continued)

mined by considering the first active time value. The method can comprise the steps of terminating the transmission procedure of the request message after receiving the reject message, and entering a PSM state on the basis of the second active time value.

11 Claims, 18 Drawing Sheets

(51) Int. Cl.
  *H04W 76/18* (2018.01)
  *H04W 4/70* (2018.01)
  *H04W 76/27* (2018.01)
(52) U.S. Cl.
  CPC .............. *H04W 4/70* (2018.02); *H04W 76/27* (2018.02); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01)

(56) References Cited

U.S. PATENT DOCUMENTS

2013/0128870 A1* 5/2013 Jeon ...................... H04W 72/04
                                                         370/336
2013/0301547 A1   11/2013 Gupta et al.
2013/0329618 A1*  12/2013 Panneerselvam ..........................
                                                         H04W 52/0235
                                                         370/311

FOREIGN PATENT DOCUMENTS

| | | |
|---|---|---|
| EP | 2509357 A1 | 10/2012 |
| GB | 2489690 A | 10/2012 |
| JP | 2015-520565 A | 7/2015 |
| KR | 10-0785814 B1 | 12/2007 |
| KR | 10-2013-0042014 A | 4/2013 |
| KR | 10-2013-0126496 A | 11/2013 |
| WO | WO 2012/025825 A2 | 3/2012 |
| WO | WO 2013/028026 A2 | 2/2013 |
| WO | WO 2013/170211 A1 | 11/2013 |
| WO | WO 2013/173814 A1 | 11/2013 |
| WO | WO 2014/005452 A1 | 1/2014 |

OTHER PUBLICATIONS

Interdigital, "Interaction between PSM and Existing Functions," 3GPP TSG CT WG1 Meeting #87, C1-141978, Phoenix (AZ), USA, May 19-23, 2014 (May 12, 2014), 5 pages.

NTT Docomo, "Summary of Discussion on T3402 in Attach Reject," 3GPP TSG CT WG1 Meeting #76, C1-120121, Xiamen, China, Feb. 6-10, 2012, slides 1-11.

* cited by examiner

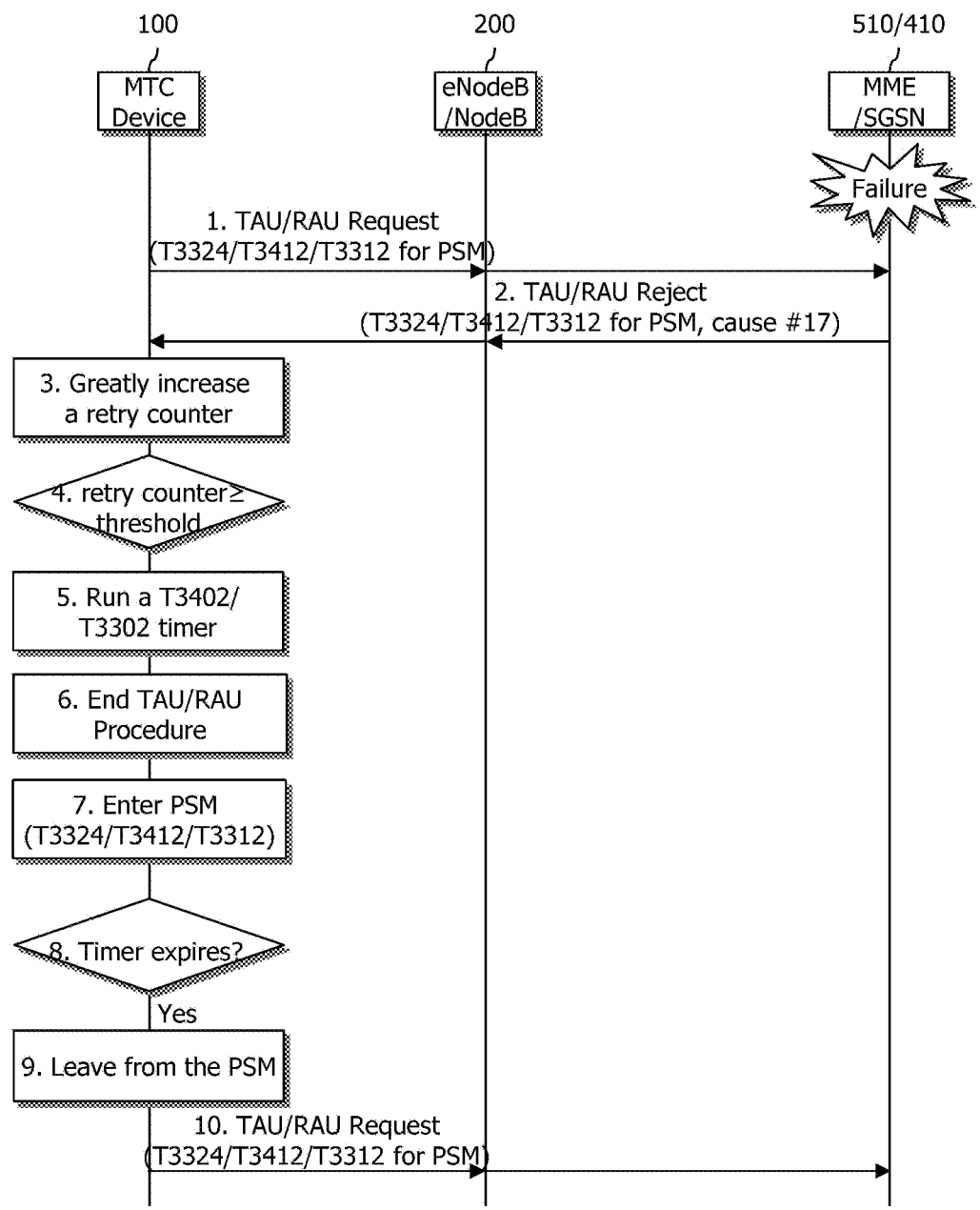

METHOD FOR SUPPORTING POWER SAVING MODE AND WIRELESS DEVICE THEREOF

CROSS REFERENCE TO RELATED APPLICATIONS

This application is the National Phase of PCT International Application No. PCT/KR2015/000465, filed on Jan. 16, 2015, which claims priority under 35 U.S.C. 119(e) to U.S. Provisional Application No. 61/929,103, filed on Jan. 19, 2014, all of which are hereby expressly incorporated by reference into the present application.

BACKGROUND OF THE INVENTION

Field of the Invention

The present invention relates to a method for supporting a power saving mode and a wireless device thereof.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (the S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or the P-GW) 53 corresponds to the termination point of a data interface toward a packet data network. The PDN GW 53 can support policy enforcement features, packet filtering, charging support, etc. Furthermore, the PDN GW (or the P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are presented in the different function entities of an E-UTRAN and an EPC is called a reference point. Table 1 below defines reference points shown in FIG. 1. In addition to the reference points shown in the example of Table 1, various reference points may be presented depending on a network configuration.

TABLE 1

| Reference point | Description |
|---|---|
| S1-MME | Reference point for the control plane protocol between E-UTRAN and the MME |
| S1-U | Reference point between E-UTRAN and Serving GW for the per bearer user plane tunnelling and inter an eNodeB path switching during handover) |
| S3 | It enables user and bearer information exchange for inter 3GPP access network mobility in Idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if |

TABLE 1-continued

| Reference point | Description |
| --- | --- |
| | the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (III), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are presented in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 transmits a randomly selected random access preamble to the eNodeB 20. Here, the UE 10 selects one of the 64 candidate random access preambles. Furthermore, the UE selects a subframe corresponding to the PRACH configuration index. The UE 10 transmits the selected random access preamble in the selected subframe.

The eNodeB 20 that has received the random access preamble transmits a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Meanwhile, research into communication between devices without human intervention, that is, machine-type communication (MTC), has been conducted in recent years.

Notably, it is important for an MTC device to extend battery life due to infrequent human intervention. To this end, studies are being conducted to enable the MTC device to operate in a power saving mode (PSM). When the MTC device enters the PSM, the MTC device may not receive downlink data as in a power-off state.

However, when the MTC device transmits a request message to a network to enter the PSM but receives a rejection message due to a network problem, the MTC device is not allowed to enter the PSM. Accordingly, inefficient energy consumption and network processing may occur.

SUMMARY OF THE INVENTION

Therefore, one disclosure of the present specification is aimed at suggesting a solution to the aforementioned problem.

To achieve the aforementioned purposes of the present invention, one disclosure of the present specification provides a method for supporting a power saving mode (PSM) in a wireless device. The method may include transmitting a request message including a first active time value to a network entity when the PSM is necessary; and receiving a rejection message in response to the request message from the network entity. Here, the rejection message may include a reason for rejection and a second active time value determined based on the first active time value. The method may include ending a procedure for transmitting the request message and entering a PSM state based on the second active time value after receiving the rejection message. Here, the wireless device may not receive downlink data in the PSM state as in a power-off state but may stay registered in a network to transmit uplink data.

The entering the PSM state may include deactivating an access stratum (AS).

The ending the procedure for transmitting the request message and entering the PSM state based on the second active time value may be performed when the reason for rejection in the rejection message is set as cause value #17 indicating a network failure or as cause value #19 indicating an ESM failure.

The request message may be an Attach Request message, a Tracking Area Update (TAU) Request message, a Routing Area Update (RAU) Request message, or a Service Request message. The rejection message may be an Attach Rejection message, a TAU Rejection message, an RAU Rejection message, or a Service Rejection message.

The request message may further include one or more of a value of a periodic TAU timer and a value of a periodic RAU timer. The rejection message may further include one or more of a value of a periodic TAU timer and a value of a periodic RAU timer which are determined by the network entity.

The value of the periodic TAU timer and the value of the periodic RAU timer may be defined as Ext T3312 or EXT T3412.

The method may further include increasing a value of a retry counter such that the value of the retry counter is equal to or greater than a predetermined threshold after receiving the rejection message; and running a back-off timer when the retry counter is equal to or greater than the predetermined threshold.

The method may further include leaving from the PSM state and additionally transmitting the request message when the back-off timer expires.

The back-off timer may be defined as timer T3402 when the network entity is an E-UTRAN. The back-off timer may be defined as timer T3302 when the network entity is a UTRAN.

The method may further include running a session management (SM) back-off timer after receiving the rejection message.

To achieve the aforementioned purposes of the present invention, one disclosure of the present specification provides a wireless device that supports a PSM. The wireless device may include a transceiver configured to transmit a request message including a first active time value to a network entity when the PSM is necessary, and to receive a rejection message in response to the request message from the network entity. The rejection message may include a reason for rejection and a second active time value determined based on the first active time value. The wireless device may include a controller configured to end a procedure for transmitting the request message and to enter a PSM state based on the second active time value after receiving the rejection message through the transceiver, in which the wireless device may not receive downlink data in the PSM state as in a power-off state but may stay registered in a network to transmit uplink data.

According to a disclosure of the present specification, the aforementioned problem of the conventional technology is solved.

BRIEF DESCRIPTION OF THE DRAWINGS

FIG. 9b is a flowchart illustrating a solution according to one embodiment in a case where a Tracking Area Update (TAU)/Routing Area Update (RAU) Reject message is received.

DESCRIPTION OF EXEMPLARY EMBODIMENTS

Figure 1:
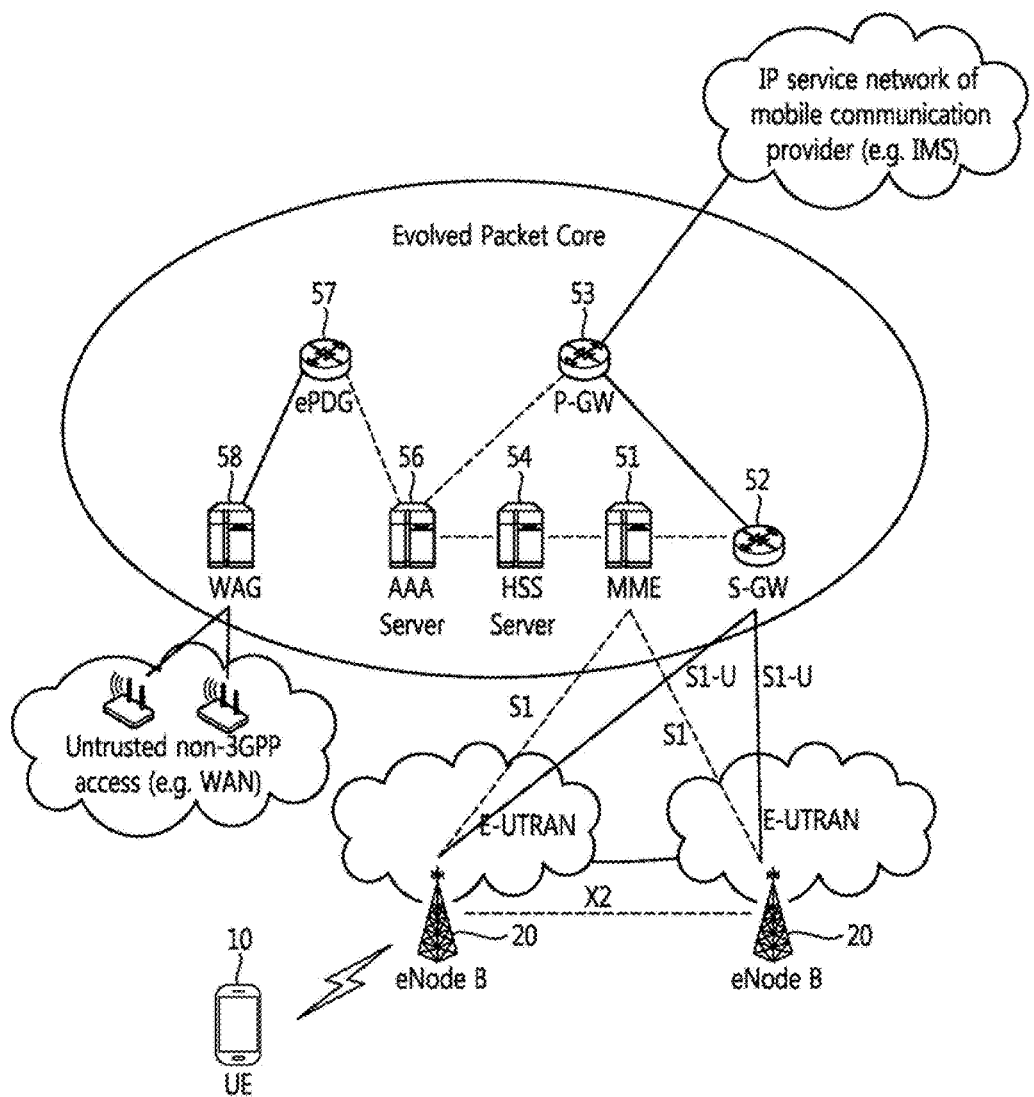
FIG. 1 shows the configuration of an evolved mobile communication network.
Figure 2:
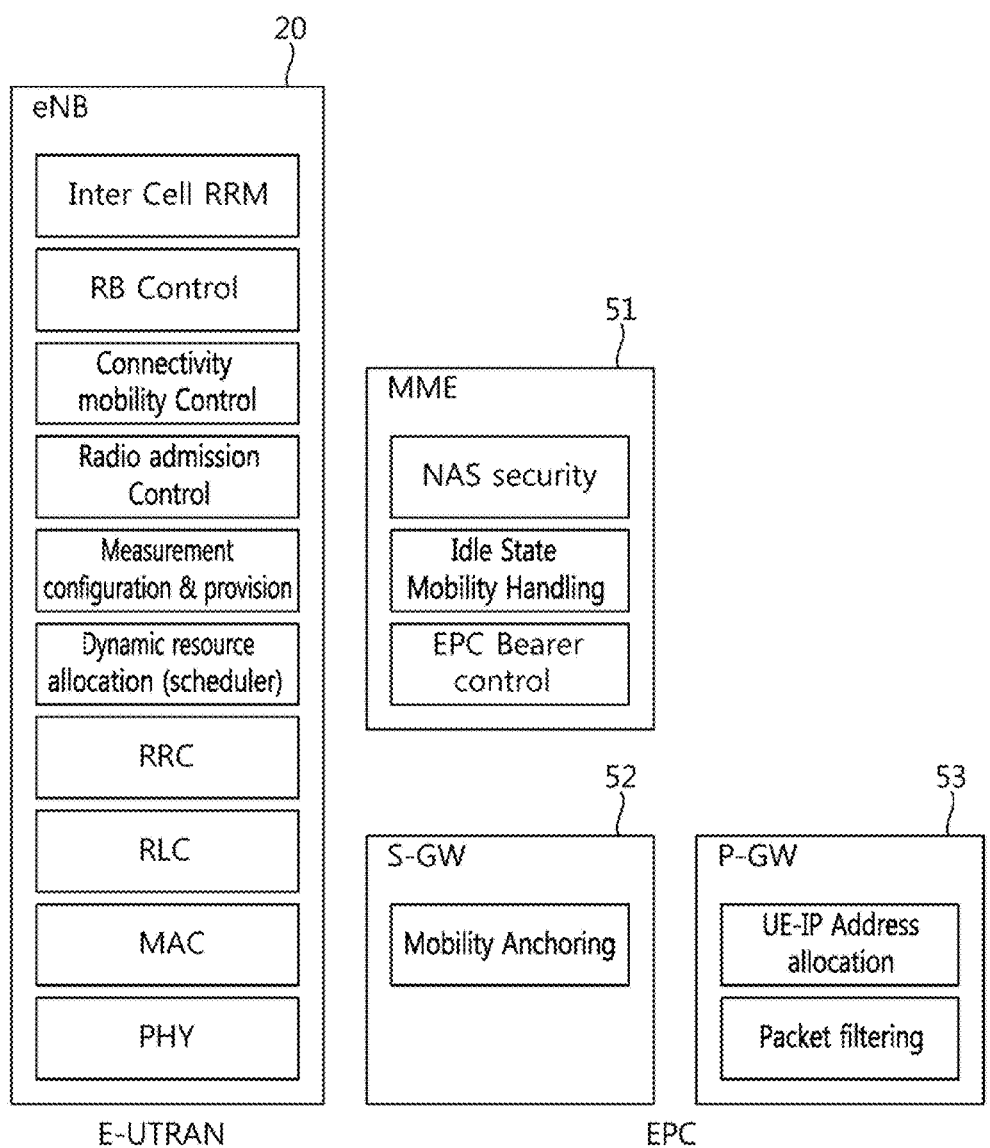
FIG. 2 is an exemplary diagram showing the architecture of a common E-UTRAN and a common EPC.
Figure 3:
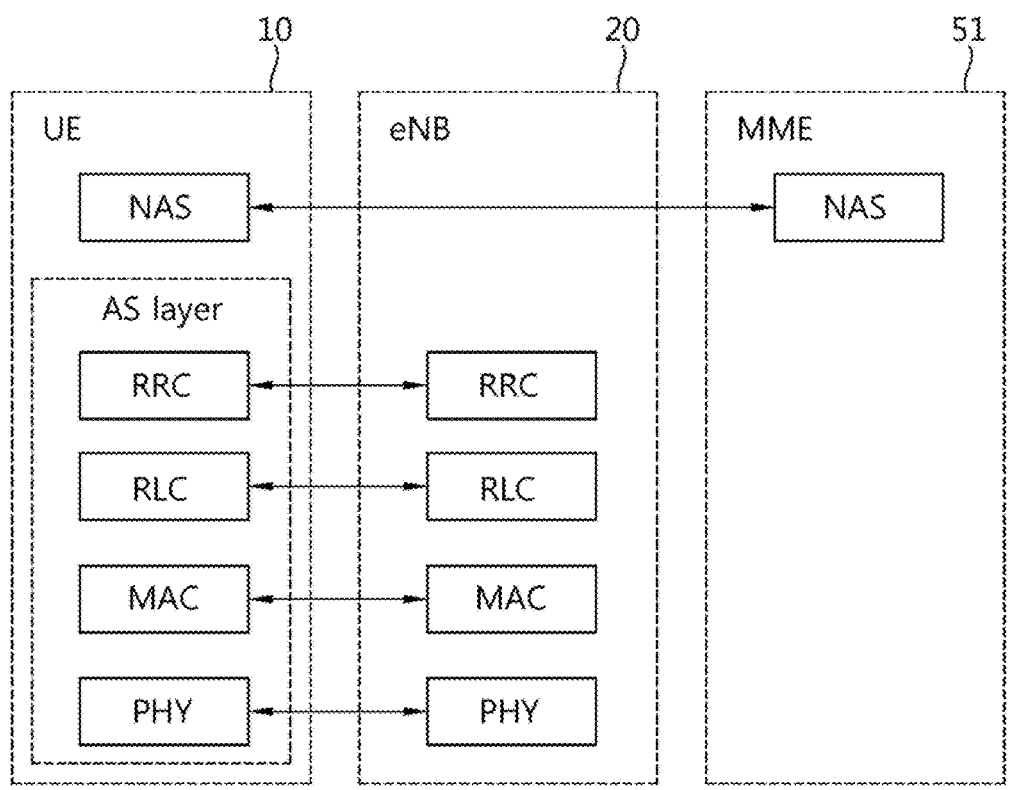
FIG. 3 is an exemplary diagram showing the structure of a radio interface protocol in a control plane between a UE and an eNodeB.
Figure 4:
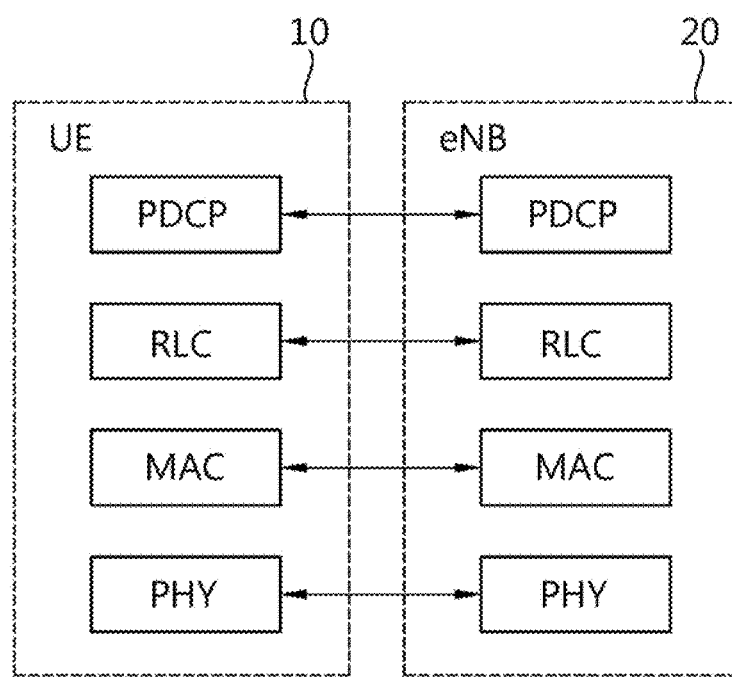
FIG. 4 is another exemplary diagram showing the structure of a radio interface protocol in a control plane between a UE and an eNodeB.
Figure 5:
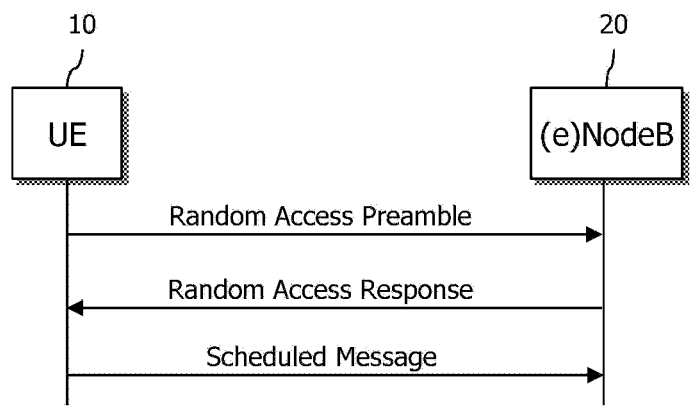
FIG. 5 is a flowchart illustrating a random access process in 3GPP LTE.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

NAS (Non-Access-Stratum): A higher stratum of a control plane between a UE and an MME. The NAS supports mobility management, session management, IP address management, etc., between the UE and the network.

<Machine-Type Communication (MTC)>

MTC refers to communication achieved between machines without human intervention, and a device used for MTC is referred to as an MTC device. Services provided via an MTC device have distinct features from communication services with human involvement, and a wide range of services may be applied.

Figure 6A:
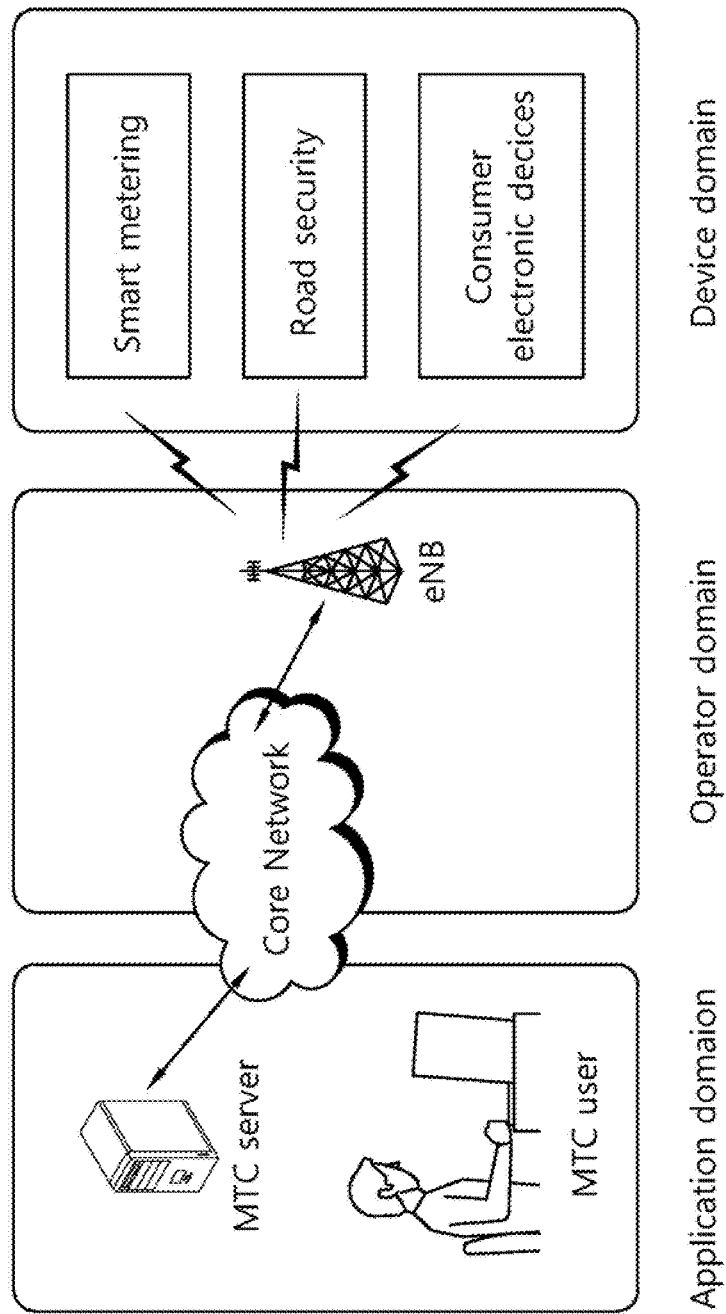
FIG. 6*a* illustrates an example of a service via an MTC device.

FIG. 6a illustrates an example of a service via an MTC device.

Services via an MTC device may be divided into a plurality of types. For example, there are a service of an MTC device monitoring various types of information and a service of an eNodeB or an entity in a core network monitoring various types of information.

Referring to FIG. 6a, as an example of a first mentioned service, there may be provided a metering service, a road information service, or a consumer electronic device manipulation service via the MTC device. Here, when the MTC device may monitor and transmit metering information and road traffic information to an eNodeB, the eNodeB may transmit the metering information and the road traffic information to an MTC server, and accordingly an MTC user may use the provided services.

A second mentioned service may be a service of monitoring movement of an MTC device installed in an object. Specifically, an MTC device is attached to a stationary object including a vending machine or to a mobile object including a car, and an eNodeB or an entity in a core network may monitor a path of the traveling MTC device.

Figure 6B:
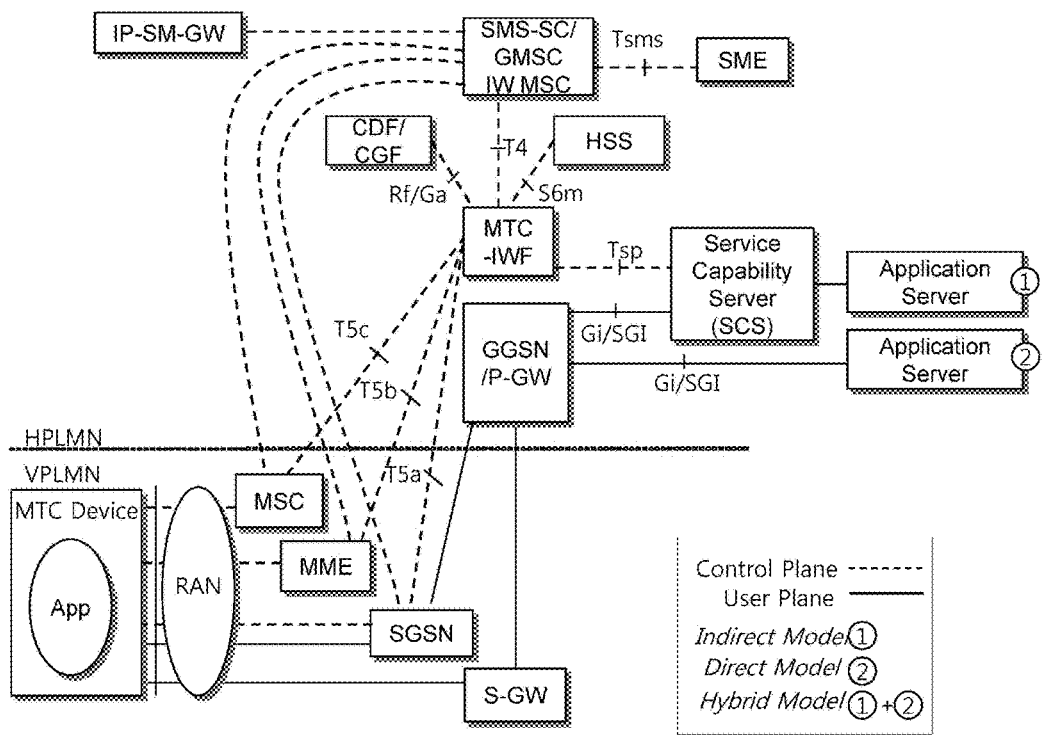
FIG. 6*b* is a conceptual view illustrating a 3GPP service model for supporting MTC.

FIG. 6b is a conceptual view illustrating a 3GPP service model for supporting MTC.

An end-to-end application between an MTC device (or MTC terminal) an MTC application may use services provided by a 3GPP system and optional services provided by an MTC server. The 3GPP system may provide transport and communication services (3GPP bearer services, including IMS and SMS) including various optimizations that facilitate MTC. FIG. 6b illustrates that the MTC device is connected to a 3GPP network (UTRAN, E-UTRAN, GERAN, I-WLAN, and the like) through Um/Uu/LTE-Uu interfaces. Architecture in FIG. 7b includes various MTC models (direct model, indirect model, and hybrid model).

Entities illustrated in FIG. 6b are described.

In FIG. 6b, an application server is a server on a network where an MTC application is run. The foregoing various MTC application implementation techniques may be applied to the MTC application server, a detailed description of which is omitted. Further, in FIG. 6b, the MTC application server may access an MTC server through a reference point API, a description of which is omitted. Alternatively, the MTC application server may be collocated with the MTC server.

The MTC server (for example, a shown SCS server) is a server on a network managing an MTC terminal and may be connected to a 3GPP network to communicate with an MTC device and PLMN nodes.

An MTC Interworking Function (MTC-IWF) may manage interworking between the MTC server and an operator core network and serve as a proxy for MTC operations. To support an MTC indirect or hybrid model, one or more MTC-IWFs may be present in a home PLMN (HPLMN). The MTC-IWF may relay or interpret a signaling protocol on reference point Tsp to operate a specific function for the PLMN. The MTC-IWF may perform a function of authenticating the MTC server before the MTC server establishes communication with the 3GPP network, a function of authenticating a control plane request from the MTC server, and various functions relating to trigger instructions to be mentioned below.

A Short Message Service-Service Center/Internet Protocol Short Message Gateway (SMS-SC/IP-SM-GW) may manage transmission and reception of a Short Message Service (SMS). The SMS-SC may relay a short message between a Short Message Entity (SME, an entity transmitting and receiving a short message) and a mobile station and serve to store and transmit the short message. The IP-SM-GW may serve protocol interworking between an IP-based terminal and the SMS-SC.

A Charging Data Function/Charging Gateway Function (CDF/CGF) may perform an operation relating to payment.

An HLR/HSS may function to store and provide subscriber information (IMSI and the like), routing information, configuration information, and the like to the MTC-IWF.

An MSC/SGSN/MME may perform control functions for connection of a UE to a network, such as mobility management, authentication, and resource assignment. Relating to triggering to be described below, the MSC/SGSN/MME may serve to receive a trigger instruction from the MTC-IWF and to process the trigger instruction into a message to be provided to the MTC device.

A Gateway GPRS Support Node (GGSN)/Serving-Gateway (S-GW)+Packet Data Network-Gateway (P-GW) may serve as a gateway in charge of connection between a core network and an outside network.

Table 2 lists main reference points in FIG. 6b.

TABLE 2

| Reference point | Description |
| --- | --- |
| Tsms | It is the reference point an entity outside the 3GPP system uses to communicate with UEs used for MTC via SMS. |
| Tsp | It is the reference point an entity outside the 3GPP system uses to communicate with the MTC-IWF related control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrrogate HSS/HLR for E.164 Mobile Station International Subscriber Directory Number (MSISDN) or external Identifier mapping to IMSI and gather UE reachability and configuration information. |

One or more reference points among T5a, T5b, and T5c are referred to as T5.

Meanwhile, user plane communication with the MTC server in the indirect and hybrid models and communication with the MTC application server in the direct and hybrid models may be performed using an existing protocol through reference points Gi and SGi.

<Power Saving Mode (PSM)>

Characteristically, an MTC device may periodically transmit mobile originating data, instead of infrequently receiving mobile terminating data. In view of such characteristic, the MTC device may operate in a power saving mode (PSM) in order to optimize energy efficiency.

When entering the PSM, the MTC device deactivates an Access Stratum (AS), and thus the PSM is similar to a power-off state. However, in the PSM, the MTC device may stay registered in a network and may thus not be re-attached to the network and not re-establish a PDN connection. Thus, the PSM is distinguished from the power-off state.

Once the MTC device enters the PSM, the MTC device stays in the PSM until a mobile originating event, for example, periodic Tracking Area Update (TAU)/Routing Area Update (RAU), occurrence of uplink data, or a Detach, causes the MTC device to start a procedure in the network.

The MTC device in the PSM may be out of the PSM whenever a mobile originating service is needed. That is, although in the PSM, the MTC device may activate the AS at any time and resume an idle-mode operation for a mobile originating service.

Meanwhile, when a mobile reachable timer expires and an active time for the MTC device expires, the MME may recognize that the MTC device enters the PSM and accordingly paging is impossible.

However, once the MTC device enters the PSM, the MTC device may not immediately receive a mobile terminating service. That is, when the MTC device enters the PSM, the MTC device may respond with respect to a mobile terminating service only in a active time period after a mobile originating event, such as signal transmission of data transmission, after a periodic TAU or RAU procedure.

Thus, the PSM is suitable for an MTC device requiring infrequent mobile originating services and mobile terminating services and also suitable only for an MTC device capable of accepting latency in communication.

Meanwhile, the MTC device needs to request active time that is long enough to receive data, such as a potential mobile terminating service or an SMS.

When the MTC device wants to use the PSM, the MTC device needs to request an active time value in each Attach and TAU/RAU procedure. If the network supports the PSM and permits the MTC device to use the PSM, the network assigns an active time value to the MTC device. The network may determine an active time value to assign to the MCT device in view of the active time value requested by the MTC device and an MME/SGSN configuration. When the active time value assigned by the network is unsatisfactory, the MTC device may request a desired active time value only in a next upcoming TAU/RAU procedure.

Further, the PSM-applicable MTC device requests, from the network, the value of a periodic TAU/RAU timer suitable for latency/responsiveness with respect to mobile terminating services during an Attach and TAU/RAU procedure. When the network assigns the value of a periodic TAU/RAU timer to the MTC device but the MTC device is unsatisfied with the value of the periodic TAU/RAU timer, the MTC device may request a desired value of the periodic TAU/RAU timer only during a period of a next upcoming TAU/RAU procedure.

Consequently, to support and use the PSM, the MTC device may request, from the network, an active time value and the value of the periodic TAU/RAU timer together during the Attach and TAU procedure. The network may not assign an active time value at random without a request from the MTC device.

Hereinafter, a description will be made with reference to drawings.

Figure 7A:
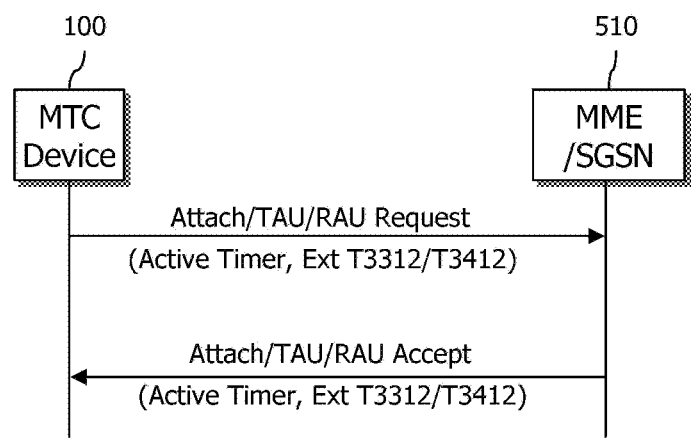
FIG. 7*a* illustrates a negotiation process for an active timer for a power saving mode (PSM)
Figure 7B:
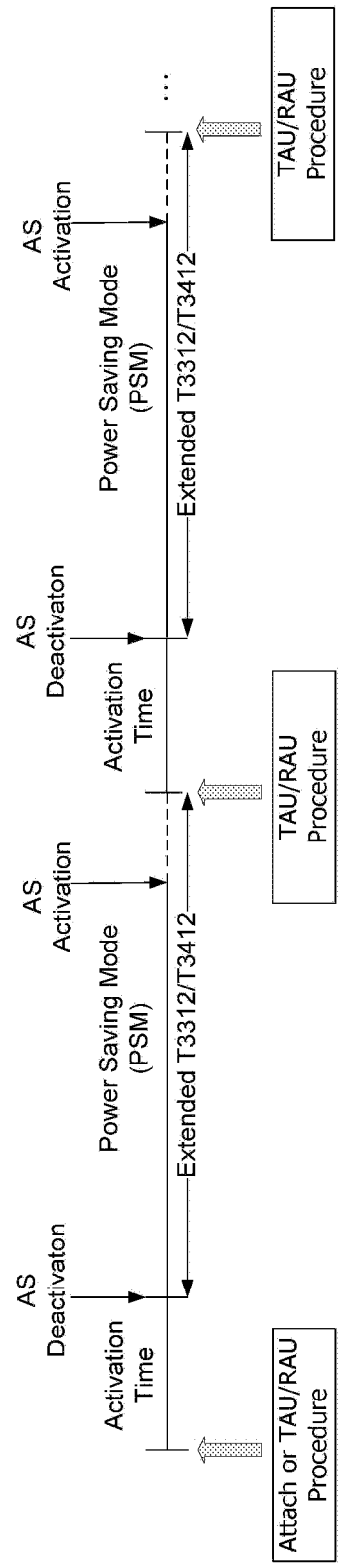
FIGS. 7*b* and 7*c* illustrate examples of operations of the PSM.
Figure 7C:
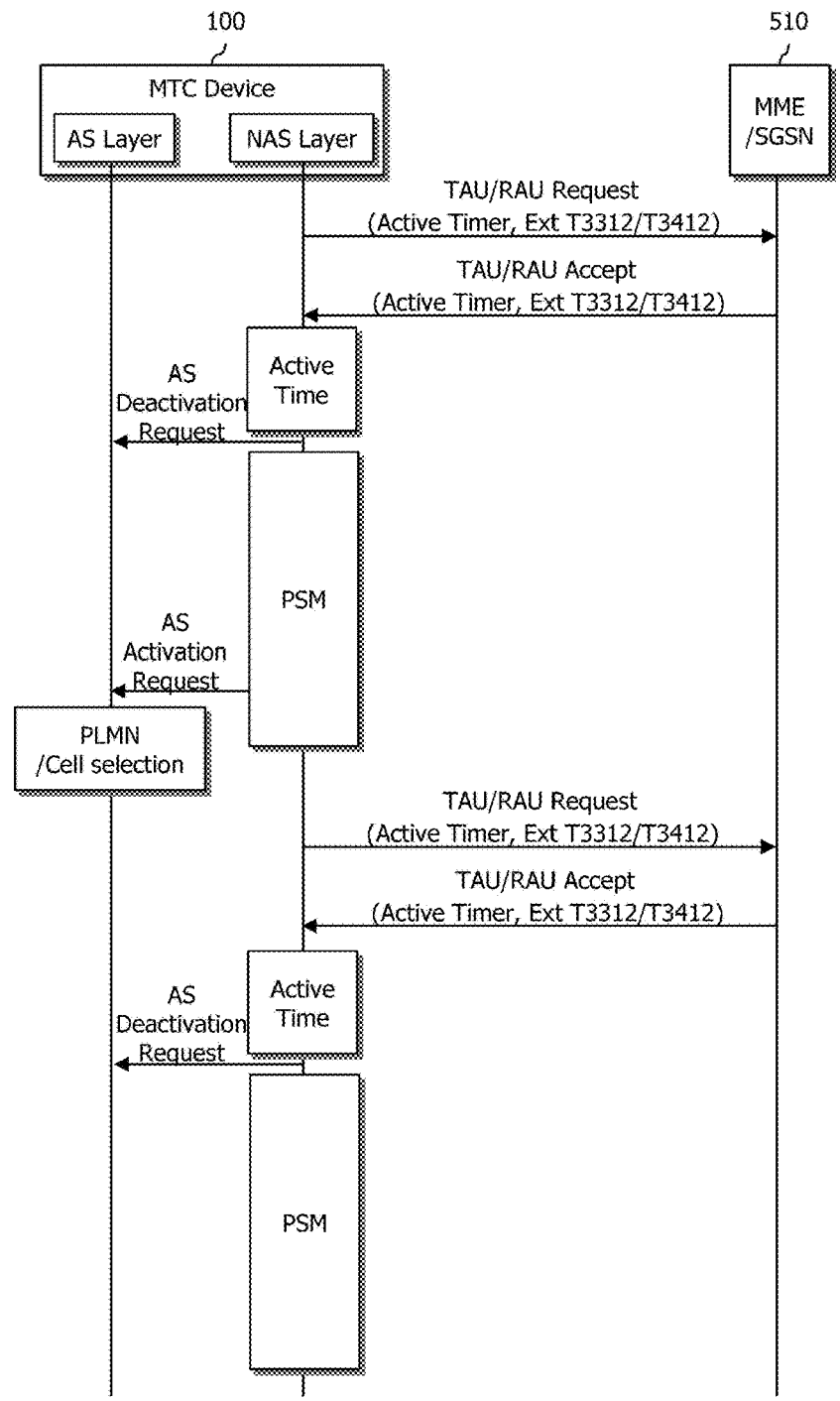

FIG. 7a illustrates a negotiation process for an active timer for the PSM, and FIGS. 7b and 7c illustrate examples of operations of the PSM.

As illustrated in FIG. 7a, an MTC device 100 transmits, to an MME/SGSN 510, an Attach Request message or a TAU Request message including an active time value (that is, the value of an active timer, for example, the value of T3324) and the value of a periodic TAU/RAU timer (for example, Ext T3412 or Ext T3312). When the MME/SGSN 510 receives the Request message, the MME/SGSN 510 identifies whether the MTC device 100 supports the PSM. If the PSM is supported, the MME/SGSN 510 transmits, to the MTC device 100, an Attach Accept message or TAU/RAU Accept message including the active time value (that is, the value of the active timer, for example, the value of T3324) and the value of the periodic TAU/RAU timer (for example, Ext T3412 or Ext T3312). Here, the active time value (that is, the value of the active timer) and the value of the periodic TAU/RAU timer (for example, Ext T3412 or Ext T3312) included in the Accept message may be MME/SGSN-desired values. Here, the value of the periodic TAU/RAU timer (for example, Ext T3412 or Ext T3312) may not be included. In this case, the MCT device may use a default value for the value of the periodic TAU/RAU timer (for example, Ext T3412 or Ext T3312). Alternatively, although the MTC device does not include the value of the periodic TAU/RAU timer (for example, Ext T3412 or Ext T3312) in the Request message, the MME may set a desired value and transmits the Accept message including the desired value.

Meanwhile, as illustrated in FIGS. 7b and 7c, when the MTC device requests the active time value and the network assigns the active time value, the MTC device operates the active timer according to the assigned active time value. Likewise, in a case of a switch from ECM_CONNECTED to ECM_IDLE, the MME operates a mobile reachable timer based on the active time value.

As illustrated in FIGS. 7b and 7c, when the active timer expires, the MTC device deactivates an AS thereof and switches to the PSM. In the PSM, the MTC device suspends all procedures in the idle mode due to inactivation of the AS, but operates an NAS timer, for example, the periodic TAU/RAU timer (for example, Ext T 3412 or Ext T 3312).

The MTC device may not activate the AS again and not resume the procedures in the idle mode until the periodic TAU/RAU timer (for example, Ext 3412 or T3312) expires to perform a periodic TAU/RAU procedure.

The MTC device activates the AS again and performs a radio access configuration process (PLMN selection or cell selection) necessary to set up communication with an EPC just before the periodic TAU/RAU timer (for example, Ext 3412 or T3312) expires.

When the periodic TAU/RAU timer (for example, Ext 3412 or T3312) expires, the MTC device performs the TAU/RAU procedure again, and subsequently enters the PSM again after active time expires.

However, when the MTC device transmits, to the network, the Attach/TAU/RAU Request message including the active time value in order to enter the PSM but receives an Attach/TAU/RAU Reject message due to a network problem, the MTC device needs to retransmit the Attach/TAU/RAU Request message and thus may not enter the PSM. Further, it is technically uncertain whether the MTC device may enter the PSM or not after the retransmission, which may further cause inefficient energy consumption and network processing.

Figure 8A:
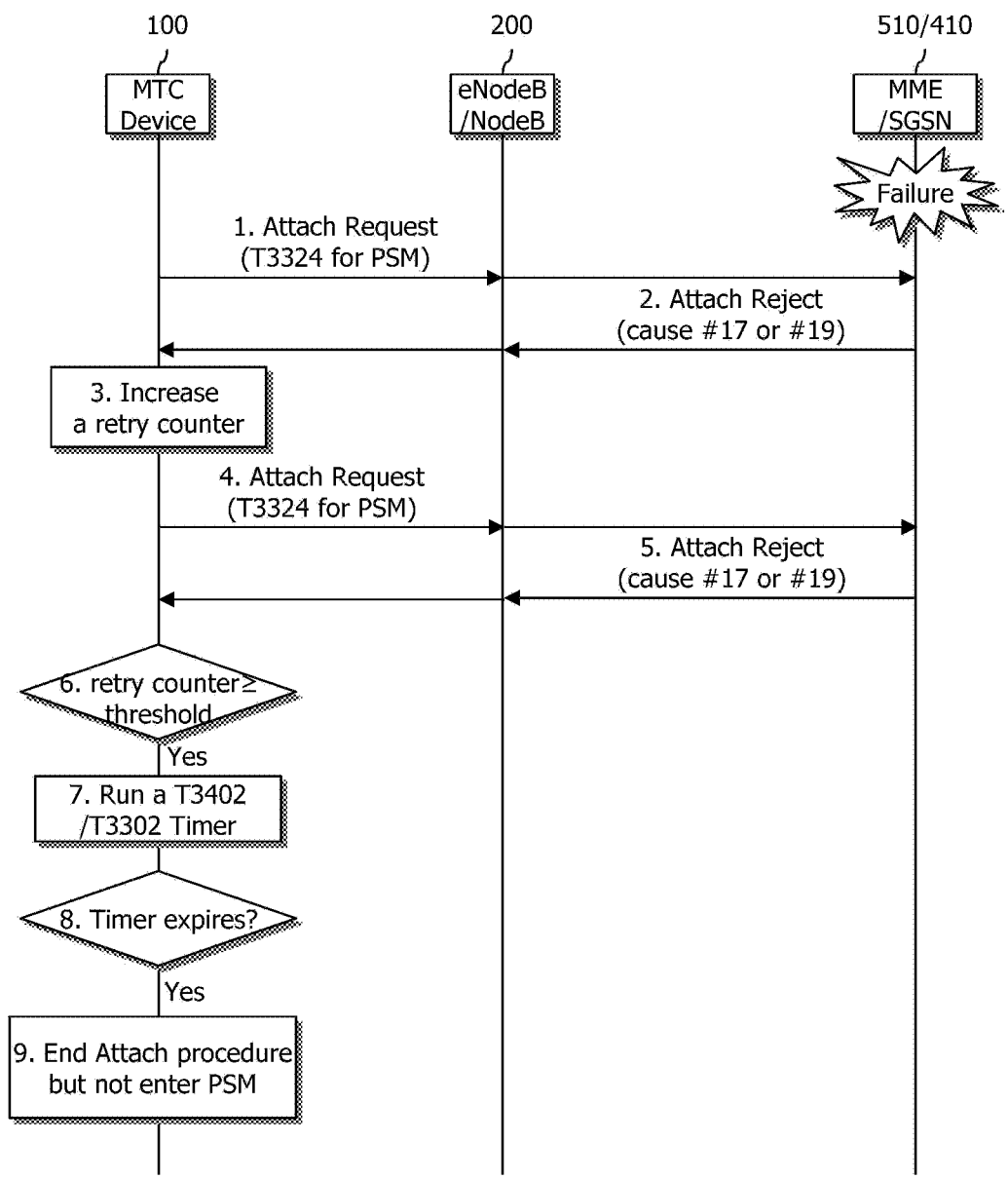
FIG. 8*a* is a signal flowchart illustrating a problematic situation that a network abnormality does not allow an MTC device to enter the PSM.

FIG. 8a is a signal flowchart illustrating a problematic situation that a network abnormality does not allow an MTC device to enter the PSM.

1) As illustrated in FIG. 8a, the MTC device 100 transmits an Attach Request message including an active time value (for example, the value of T3324) for the PSM to an MME/SGSN 510/410 through an eNodeB/NodeB 200.

2) The MTC device 100 receives an Attach Reject message due to a network abnormality (for example, a network failure). Here, cause value #17 indicating a network failure or cause value #19 (ESM cause value #38) indicating an ESM failure is set in a Reason for Rejection field in the Attach Reject message.

3-4) The MTC device 100 increases a retry counter by one level, and retransmits the Attach Request message until the value of the retry counter reaches a threshold (for example, 5). For the retransmission, the MTC device 100 may not enter the PSM.

5) As the network abnormality is still not resolved, the MTC device 100 receives the Attach Reject message.

6-7) When the value of the retry counter reaches the threshold, the MTC device 100 operates a delay time timer (that is, a back-off timer), for example, T3402 in an E-UTRAN or T3302 in a UTRAN.

8-9) When the timer expires, the MTC device 100 stops the Attach Request procedure. However, the MTC device 100 does not enter the PSM and causes battery consumption.

Figure 8B:
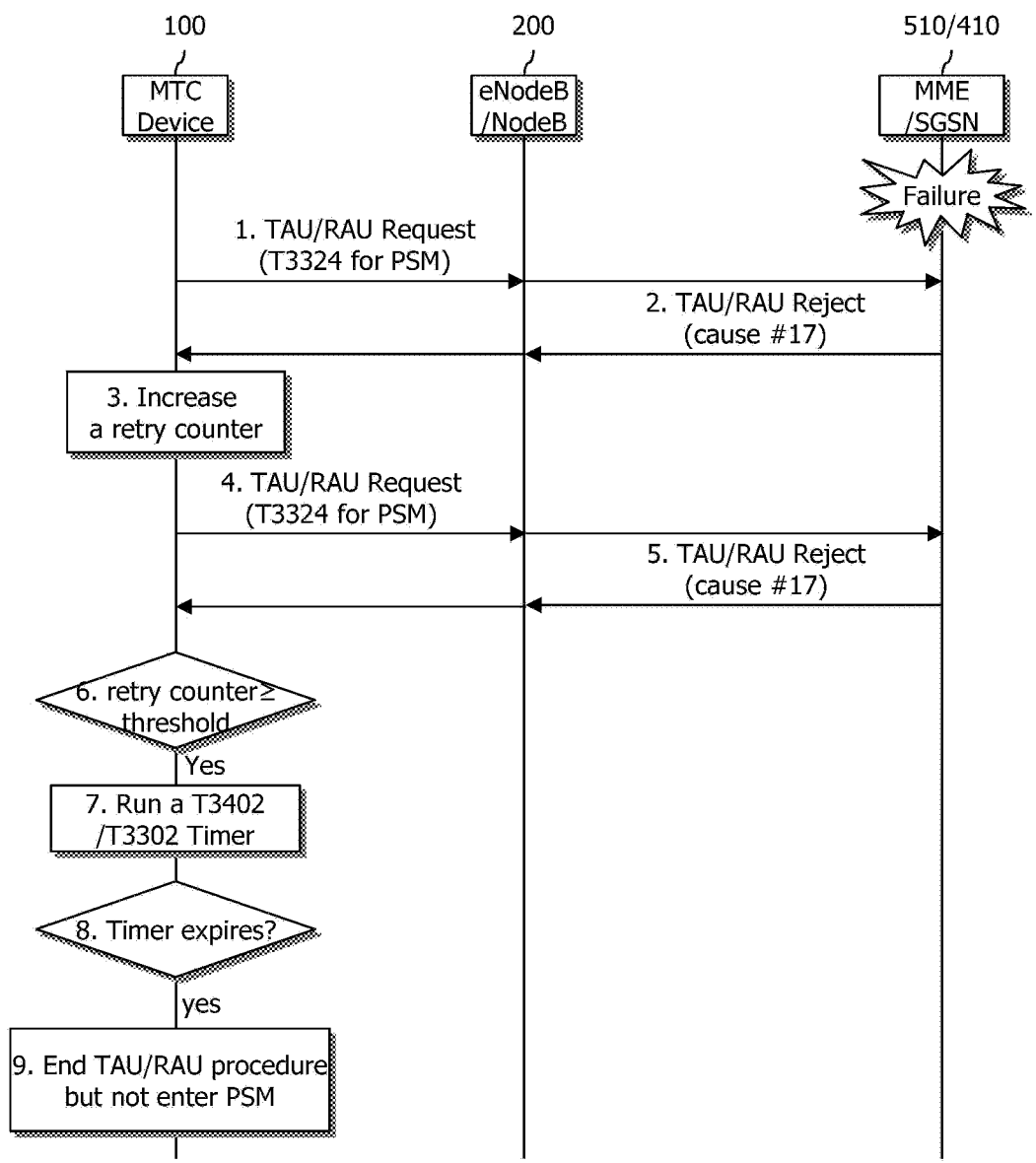
FIG. 8b is a signal flowchart illustrating another problematic situation that a network abnormality does not allow an MTC device to enter the PSM.

FIG. 8b is a signal flowchart illustrating another problematic situation that a network abnormality does not allow an MTC device to enter the PSM.

1) As illustrated in FIG. 8b, the MTC device 100 transmits a TAU/RAU Request message including an active time value (for example, the value of T3324) for the PSM to an MME/SGSN 510/410 through an eNodeB/NodeB 200.

2) The MTC device 100 receives an Attach Reject message due to a network abnormality (for example, a network failure). Here, cause value #17 indicating a network failure is set in a Reason for Rejection field in the Attach Reject message.

3-4) The MTC device 100 increases a retry counter by one level, and retransmits the TAU/RAU Request message until the value of the retry counter reaches a threshold (for example, 5). For the retransmission, the MTC device 100 may not enter the PSM.

5) As the network abnormality is still not resolved, the MTC device 100 receives the TAU/RAU Reject message.

6-7) When the value of the retry counter reaches the threshold, the MTC device 100 operates a delay time timer (that is, a back-off timer), for example, T3402 in an E-UTRAN or T3302 in a UTRAN.

8-9) When the timer expires, the MTC device 100 stops the TAU/RAU Request procedure. However, the MTC device 100 does not enter the PSM and causes battery consumption.

As illustrated in FIGS. 8a and 8b, when cause value #17 indicating a network failure, cause value #19 indicating an ESM failure, or cause value #38 indicating rejection of a PDN connection is set in the Reason for Rejection fields included in the Attach/TAU/RAU Reject messages received by the MTC device 100, retransmission of the Attach/TAU/RAU Request messages by the MTC device causes unnecessary waste of radio resources. Further, the MTC device is not allowed to enter the PSM for the retransmission, thus causing battery consumption.

Meanwhile, although the MTC device 100 wants to use the PSM, the MTC device 100 is not allowed to request an active time value (for example, the value of T3324) during a Service Request procedure. That is, the MTC device 100 is not allowed to transmit a Service Request message including the active time value. Even though the MTC device 100 is allowed to transmit the Service Request message for the PSM, when the MTC device 100 receives a Service Reject message due to a network abnormality, the MTC device 100 may not enter the PSM, which will be described with reference to FIG. 8c.

Figure 8C:
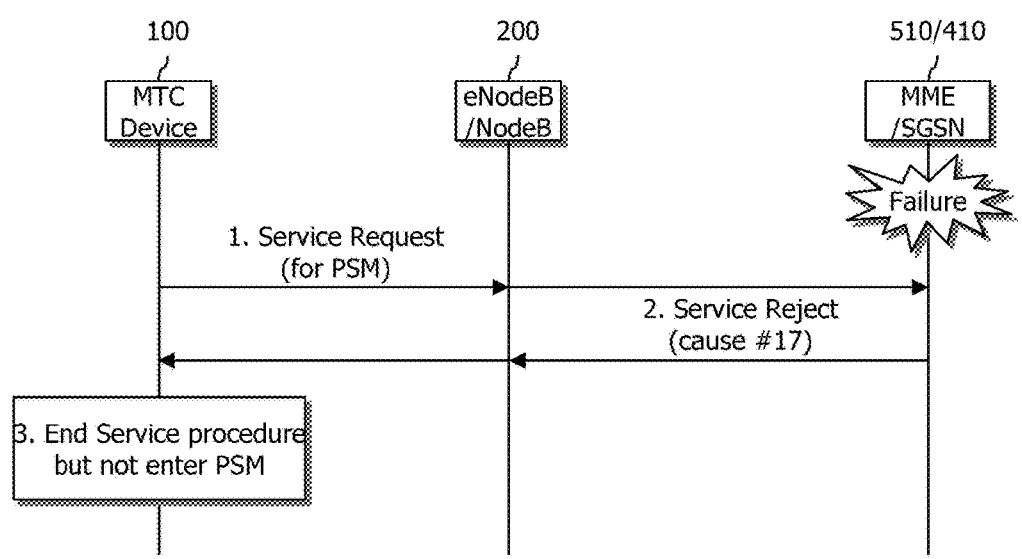
FIG. 8c is a signal flowchart illustrating still another problematic situation that a network abnormality does not allow an MTC device to enter the PSM.

FIG. 8c is a signal flowchart illustrating still another problematic situation that a network abnormality does not allow an MTC device to enter the PSM.

In FIG. 8c, it is assumed that the MTC device 100 is allowed to transmit a Service Request message for the PSM. When the MTC device 100 transmits the Service Request message but receives a Service Reject message due to a network abnormality, the MTC device 100 ends a Service Request procedure but is not allowed to enter the PSM.

<Disclosure of the Present Specification>

Thus, a disclosure of the present specification suggests solutions to the foregoing problems. Specifically, the disclosure of the present specification suggests an efficient PSM operation of an MTC device in a case where the MTC receives Attach/TAU/RAU/Service Reject messages in occurrence of a network abnormality.

More specifically, according to the disclosure of the present specification, when the MTC device receives the Attach/TAU/RAU/Service Reject messages in occurrence of a network abnormality, the MTC device is allowed to enter the PSM, without retransmitting Attach/TAU/RAU/Service Request messages, thereby preventing waste of radio resources and battery consumption.

Figure 9A:
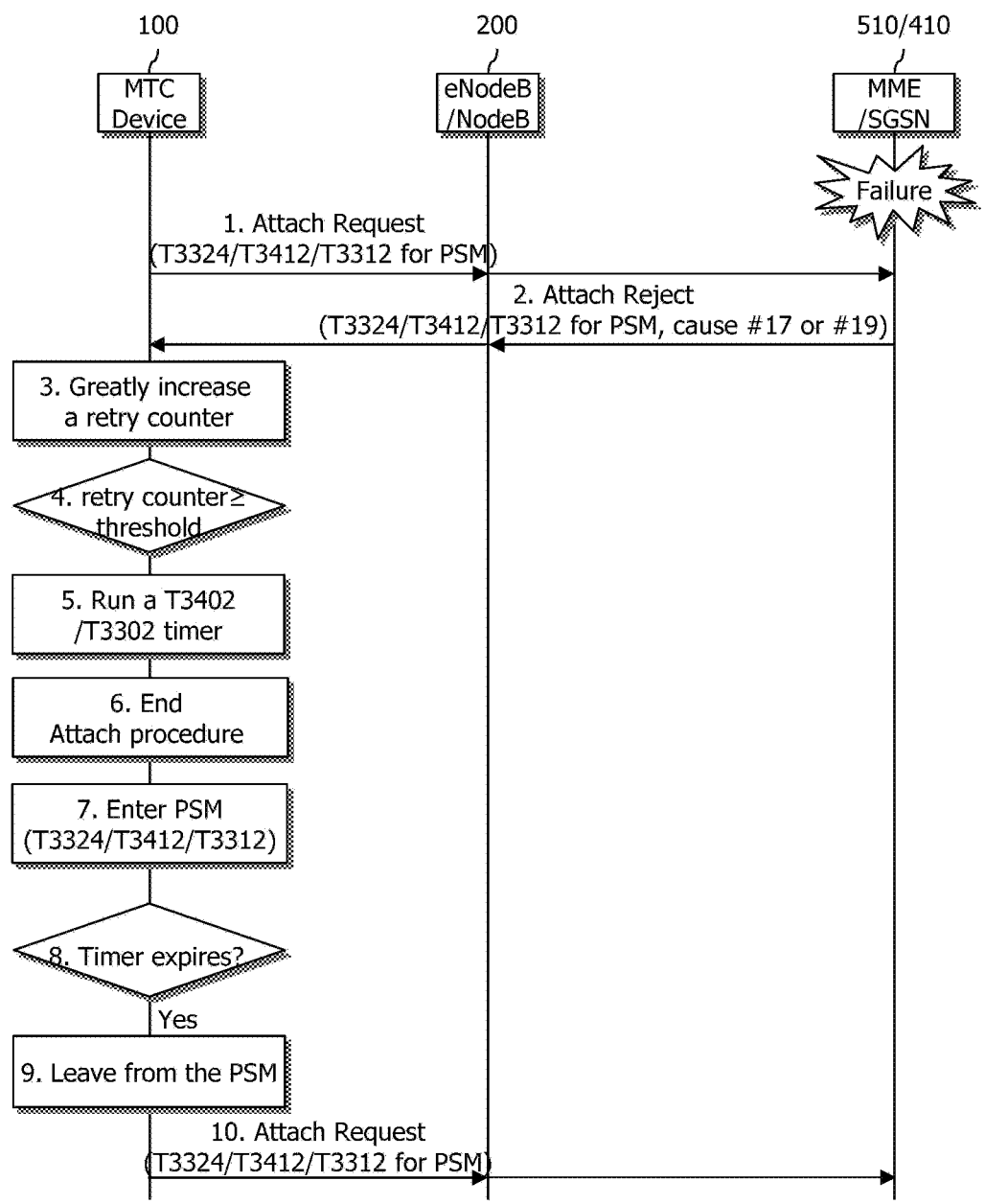
FIG. 9a is a flowchart illustrating a solution according to one embodiment in a case where an Attach Reject message is received.

FIG. 9a is a flowchart illustrating a solution according to one embodiment in a case where an Attach Reject message is received.

As illustrated in FIG. 9a, when the MTC device 100 receives the Attach Reject message in occurrence of a network abnormality, the embodiment allows the MTC device 100 to enter the PSM, which is described in detail as follows.

1) First, when the MTC device 100 wants the PSM, the MTC device 100 transmits an Attach Request message including an active time value (for example, the value of T3324) for the PSM to an MME/SGSN 510/410 through an eNodeB/NodeB 200. Here, the Attach Request message may include the value of a periodic TAU/RAU timer (for example, Ext T3412 or Ext T3312).

2) The MME/SGSN 510/410 transmits an Attach Reject message due to a network abnormality (for example, a network failure). Here, the MME/SGSN 510/410 may set a Reason for Rejection field in the Attach Reject message as cause value #17 indicating a network failure or as cause value #19 (ESM cause value #38) indicating an ESM failure. Meanwhile, the MME/SGSN 510/410 includes the active time value (for example, the value of T3224) to allocate to the MTC device 100 in the Attach Reject message. Further, the MME/SGSN 510/410 may include the value of the periodic TAU/RAU timer (for example, Ext T3412 or Ext T3312) in the Attach Reject message.

3-5) When the MTC device 100 receives the Attach Reject message, the MTC device 100 checks the Reason for Rejection field in the Attach Reject message. After checking the Reason for Rejection field, the MTC device 100 greatly increases the value a retry counter such that the value of the retry counter is equal to or greater than a threshold. Accordingly, the MTC device 100 operates a delay time timer (that is, a back-off timer), for example, T3402 in an E-UTRAN or T3302 in a UTRAN.

6-7) Subsequently, the MTC device 100 ends the Attach procedure, sets the value of the periodic TAU/RAU timer (for example, Ext T3412 or Ext T3312) and the active time value (for example, the value of T3224), and then enters the PSM.

8-10) When the delay time timer (that is, the back-off timer) expires, the MTC device 100 is out of the PSM and transmits the Attach Request message.

FIG. 9b is a flowchart illustrating a solution according to one embodiment in a case where a TAU/RAU Reject message is received.

As illustrated in FIG. 9b, when the MTC device 100 receives the TAU/RAU Reject message in occurrence of a network abnormality, the embodiment allows the MTC device 100 to enter the PSM, which is described in detail as follows.

1) First, when the MTC device 100 wants the PSM, the MTC device 100 transmits a TAU/RAU Request message including an active time value (for example, the value of T3324) for the PSM to an MME/SGSN 510/410 through an eNodeB/NodeB 200. Here, the TAU/RAU Request message may include the value of a periodic TAU/RAU timer (for example, Ext T3412 or Ext T3312).

2) The MME/SGSN 510/410 transmits a TAU/RAU Reject message due to a network abnormality (for example, a network failure). Here, the MME/SGSN 510/410 may set a Reason for Rejection field in the TAU/RAU Reject message as cause value #17 indicating a network failure. Meanwhile, the MME/SGSN 510/410 includes the active time value (for example, the value of T3224) to allocate to the MTC device 100 in the TAU/RAU Reject message. Further, the MME/SGSN 510/410 may include the value of the periodic TAU/RAU timer (for example, Ext T3412 or Ext T3312) in the TAU/RAU Reject message.

3-5) When the MTC device 100 receives the TAU/RAU Reject message, the MTC device 100 checks the Reason for Rejection field in the TAU/RAU Reject message. After checking the Reason for Rejection field, the MTC device 100 greatly increases the value a retry counter such that the value of the retry counter is equal to or greater than a threshold. Accordingly, the MTC device 100 operates a delay time timer (that is, a back-off timer), for example, T3402 in an E-UTRAN or T3302 in a UTRAN.

6-7) Subsequently, the MTC device 100 ends the TAU/RAU Request procedure, sets the value of the periodic TAU/RAU timer (for example, Ext T3412 or Ext T3312) and the active time value (for example, the value of T3224), and then enters the PSM.

8-10) When the delay time timer (that is, the back-off timer) expires, the MTC device 100 is out of the PSM and transmits the Attach Request message.

Figure 9C:
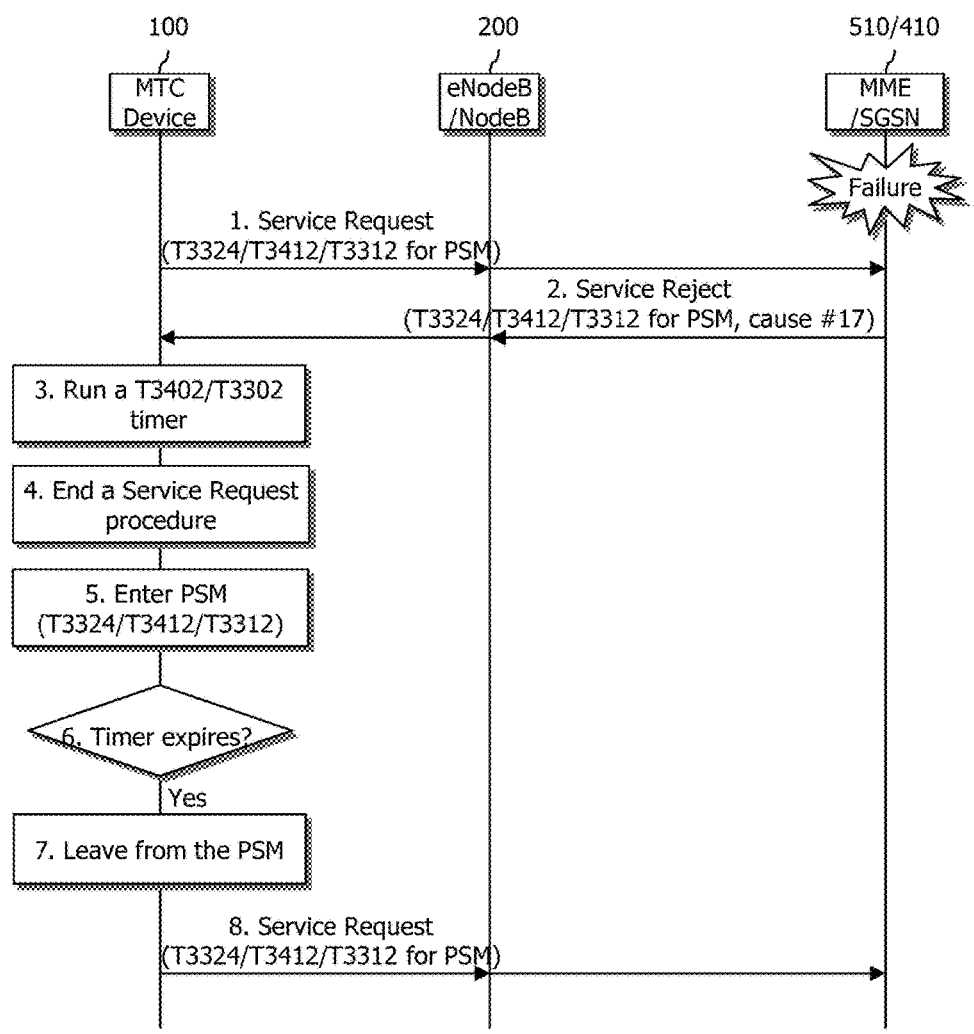
FIG. 9c is a flowchart illustrating a solution according to one embodiment in a case where a Service Reject message is received.

FIG. 9c is a flowchart illustrating a solution according to one embodiment in a case where a Service Reject message is received.

As illustrated in FIG. 9c, when the MTC device 100 receives the Service Reject message in occurrence of a network abnormality, the embodiment allows the MTC device 100 to enter the PSM, which is described in detail as follows.

1) First, when the MTC device 100 wants the PSM, the MTC device 100 transmits a Service Request message including an active time value (for example, the value of T3324) for the PSM to an MME/SGSN 510/410 through an eNodeB/NodeB 200. Here, the Service Request message may include the value of a periodic TAU/RAU timer (for example, Ext T3412 or Ext T3312).

2) The MME/SGSN 510/410 transmits a Service Reject message due to a network abnormality (for example, a network failure). Here, the MME/SGSN 510/410 may set a Reason for Rejection field in the Service Reject message as cause value #17 indicating a network failure. Meanwhile, the MME/SGSN 510/410 includes the active time value (for example, the value of T3224) to allocate to the MTC device 100 in the Service Reject message. Further, the MME/SGSN 510/410 may include the value of the periodic TAU/RAU timer (for example, Ext T3412 or Ext T3312) in the Service Reject message.

3) When the MTC device 100 receives the Service Reject message, the MTC device 100 checks the Reason for Rejection field in the Service Reject message. After checking the Reason for Rejection field, the MTC device 100 operates a delay time timer (that is, a back-off timer), for example, T3402 in an E-UTRAN or T3302 in a UTRAN.

4-5) Subsequently, the MTC device 100 ends the Service Request procedure, sets the value of the periodic TAU/RAU timer (for example, Ext T3412 or Ext T3312) and the active time value (for example, the value of T3224), and then enters the PSM.

6-8) When the delay time timer (that is, the back-off timer) expires, the MTC device 100 is out of the PSM and transmits the Service Request message.

In FIGS. 9*a* to 9*c*, the delay time timer (that is, the back-off timer, for example, T3402 or T3302) is received from the network, being included in an Accept message of a previous Attach procedure, an Accept message of a previous TAU/RAU procedure, or a Reject message of a previous Attach procedure. If the delay time timer is not received from the network, the MTC device may apply 12 minutes by default.

Further, in FIGS. 9*a* to 9*c*, the periodic TAU/RAU timer (for example, Ext T3412 or Ext T3312) is received from the network, being included in an Accept message of a previous Attach procedure or an Accept message of a previous TAU/RAU procedure. If the periodic TAU/RAU timer is not received from the network, the MTC device may apply 54 minutes by default.

Figure 10:
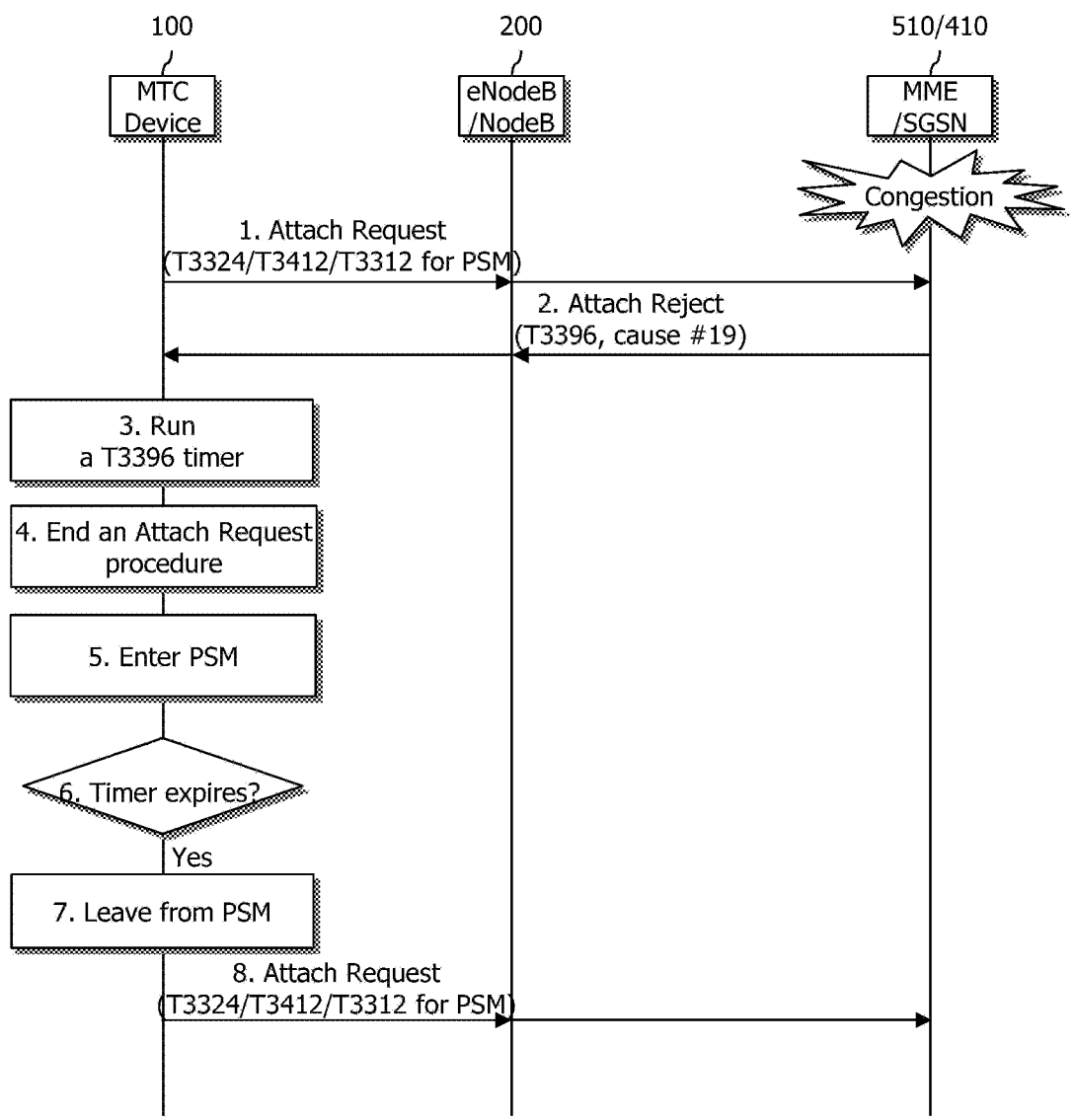
FIG. 10 is a flowchart illustrating a solution according to another embodiment in a case where an Attach Reject message is received.

FIG. 10 is a flowchart illustrating a solution according to another embodiment in a case where an Attach Reject message is received.

As illustrated in FIG. 10, when the MTC device 100 receives the Attach Reject message including a Reason for Rejection field, set as cause value #19 (ESM cause value #26 or ESM cause value #27) indicating an ESM failure, and a session management (SM) delay time timer (that is, SM back-off timer, for example, T3396), the embodiment allows the MTC device 100 to stop the Attach Request procedure and to enter the PSM, which is described in detail as follows.

1) First, when the MTC device 100 wants the PSM, the MTC device 100 transmits an Attach Request message including an active time value (for example, the value of T3324) for the PSM to an MME/SGSN 510/410 through an eNodeB/NodeB 200. Here, the Attach Request message may include the value of a periodic TAU/RAU timer (for example, Ext T3412 or Ext T3312). Further, an ESM container in the Attach Request message may also include PDN connectivity.

2) The MME/SGSN 510/410 transmits an Attach Reject message. Here, the MME/SGSN 510/410 may set a Reason for Rejection field in the Attach Reject message as cause value #19 indicating an ESM failure. If the MTC device transmits the Attach Request message including PDN connectivity in the ESM container, the MME/SGSN 510/410 may include an EPS SM Reject message in the Attach Reject message. Here, ESM cause value #26 indicating insufficient resources or ESM cause value #27 indicating a missing APN or unknown APN may be set in a Reason for Rejection field in the EPS SM Reject message. In this case, the MME/SGSN 510/410 may include the value of an SM delay time timer (that is, SM back-off timer, for example, T3396) in the Attach Reject message. Further, in this case, the MME/SGSN 510/410 may not include an active time value (for example, the value of T3224) to allocate to the MTC device 100 in the Attach Reject message.

3-5) When the MTC device 100 receives the Attach Reject message, the MTC device 100 checks the Reason for Rejection field in the Attach Reject message. After checking the Reason for Rejection field, the MTC device 100 operates the SM delay time timer (that is, SM back-off timer), for example, T3396. The MTC device 100 ends the Attach procedure and enters the PSM.

6-8) When the timer expires, the MTC device 100 is out of the PSM and transmits the Attach Request message.

The foregoing descriptions may be implemented in hardware, which is described with reference to FIG. 11.

Figure 11:
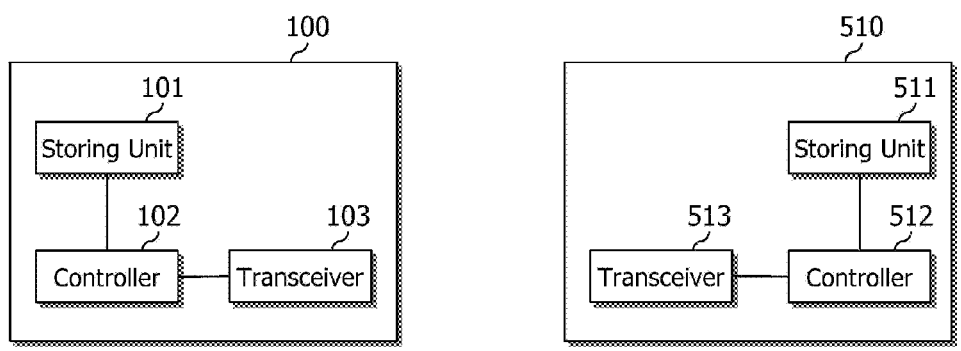
FIG. 11 is a block diagram illustrating configurations of an MTC device 100 and an MME 510 according to an embodiment of the present invention.

FIG. 11 is a block diagram illustrating configurations of an MTC device 100 and an MME 510 according to an embodiment of the present invention.

As illustrated in FIG. 11, the MTC device 100 includes a storing unit 101, a controller 102, and a transceiver 103. The MME 510 includes a storing unit 511, a controller 512, and a transceiver 513.

The storing units 101 and 511 store the foregoing methods.

The controllers 102 and 512 control the storing units 101 and 511 and the transceivers 103 and 513. Specifically, the controllers 102 and 512 implement the foregoing methods stored in the storing units 101 and 511. The controllers 102 and 512 transmit the foregoing signals through the transceivers 103 and 513.

Although exemplary embodiments of the present invention have been illustrated above, the scope of the present invention is not limited by these specific embodiments. Therefore, the present invention may be changed, modified, or adapted variously without departing from the idea of the present invention and the appended claims.

What is claimed is:

1. A method of supporting a power saving mode (PSM) in a wireless device, the method comprising:
   transmitting a request message comprising a first active time value to a network entity when the PSM is necessary;
   receiving a rejection message in response to the request message from the network entity, the rejection message comprising a reason for rejection and a second active time value determined based on the first active time value; and
   ending a procedure for transmitting the request message and entering a PSM state based on the second active time value after receiving the rejection message, the wireless device not receiving downlink data in the PSM state as in a power-off state but staying registered in a network to transmit uplink data.

2. The method of claim 1, wherein the entering the PSM state comprises:
   deactivating an access stratum (AS).

3. The method of claim 1, wherein the ending the procedure for transmitting the request message and entering the PSM state based on the second active time value is performed when the reason for rejection in the rejection message is set as a cause value #17 indicating a network failure or as a cause value #19 indicating an Evolved Session Management (ESM) failure.

4. The method of claim 1, wherein the request message is an Attach Request message, a Tracking Area Update (TAU) Request message, a Routing Area Update (RAU) Request message, or a Service Request message, and wherein the rejection message is an Attach Rejection message, a TAU Rejection message, an RAU Rejection message, or a Service Rejection message.

5. The method of claim 1, wherein the request message further comprises one or more of a value of a periodic Tracking Area Update (TAU) timer and a value of a periodic Routing Area Update (RAU) timer, and wherein the rejection message further comprises one or more of a value of a periodic TAU timer and a value of a periodic RAU timer which are determined by the network entity.

6. The method of claim 5, wherein the value of the periodic TAU timer and the value of the periodic RAU timer are defined as an Ext T3312 or an Ext T3412.

7. The method of claim 1, further comprising:
increasing a value of a retry counter such that the value of the retry counter is equal to or greater than a predetermined threshold after receiving the rejection message; and
running a back-off timer when the retry counter is equal to or greater than the predetermined threshold.

8. The method of claim 7, further comprising
leaving from the PSM state and additionally transmitting the request message when the back-off timer expires.

9. The method of claim 7, wherein the back-off timer is defined as a timer T3402 when the network entity is an Evolved Universal Mobile Telecommunications System (UMTS) Terrestrial Radio Access Network (E-UTRAN), and wherein the back-off timer is defined as a timer T3302 when the network entity is a UMTS Terrestrial Radio Access Network (UTRAN).

10. The method of claim 1, further comprising running a session management (SM) back-off timer after receiving the rejection message.

11. A wireless device that supports a power saving mode (PSM), the wireless device comprising:
a transceiver configured to transmit a request message comprising a first active time value to a network entity when the PSM is necessary, and to receive a rejection message in response to the request message from the network entity,
wherein the rejection message includes a reason for rejection and a second active time value determined based on the first active time value; and
a processor connected to transceiver and configured to control the transceiver,
wherein the processor ends a procedure for transmitting the request message and enters a PSM state based on the second active time value after receiving the rejection message through the transceiver, and
wherein the processor controls the transceiver not to receive downlink data in the PSM state as in a power-off state but controls the wireless device to stay registered in a network to transmit uplink data.

* * * * *